United States Patent
Youk et al.

(10) Patent No.: US 11,912,810 B2
(45) Date of Patent: Feb. 27, 2024

(54) COMPOSITION FOR PREPARING VINYL CHLORIDE-BASED POLYMER AND METHOD FOR PREPARING VINYL CHLORIDE-BASED POLYMER USING THE SAME

(71) Applicant: LG CHEM, LTD., Seoul (KR)

(72) Inventors: Kyung Seog Youk, Daejeon (KR); Heung Kwon Bae, Daejeon (KR); Jung Rae Lee, Daejeon (KR); Hyun Min Lee, Daejeon (KR); Joong Chul Lim, Daejeon (KR); Min Jeong Kang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 565 days.

(21) Appl. No.: 17/058,316

(22) PCT Filed: Oct. 7, 2019

(86) PCT No.: PCT/KR2019/013091
§ 371 (c)(1),
(2) Date: Nov. 24, 2020

(87) PCT Pub. No.: WO2020/076023
PCT Pub. Date: Apr. 16, 2020

(65) Prior Publication Data
US 2021/0087303 A1    Mar. 25, 2021

(30) Foreign Application Priority Data
Oct. 8, 2018 (KR) .................... 10-2018-0119879

(51) Int. Cl.
*C08F 4/38* (2006.01)
*C08F 2/22* (2006.01)

(52) U.S. Cl.
CPC ................ *C08F 4/38* (2013.01); *C08F 2/22* (2013.01)

(58) Field of Classification Search
CPC ..................................... C08F 4/38; C08F 2/22

USPC ........................................................ 524/111
See application file for complete search history.

(56) References Cited

U.S. PATENT DOCUMENTS

| | | | |
|---|---|---|---|
| 3,951,925 A | 4/1976 | Mishima et al. | |
| 8,691,927 B2 | 4/2014 | Shin et al. | |
| 2004/0077765 A1* | 4/2004 | Massillon | C08F 259/04 |
| | | | 524/458 |
| 2012/0123077 A1 | 5/2012 | Shin et al. | |
| 2016/0376387 A1 | 12/2016 | Ko et al. | |

FOREIGN PATENT DOCUMENTS

| | | | |
|---|---|---|---|
| JP | S46-012473 B2 | 3/1971 | |
| JP | S49-002189 B2 | 1/1974 | |
| JP | 2970659 B2 | 11/1999 | |
| JP | 2000-204211 A | 7/2000 | |
| JP | 2004-051770 A | 2/2004 | |
| JP | 2006306963 A * | 11/2006 | |
| JP | 2006306963 A | 11/2006 | |
| JP | 2007191610 A | 8/2007 | |
| JP | 2009-057486 A | 3/2009 | |
| KR | 10-0253685 B | 4/2000 | |
| KR | 10-2002-0052664 A | 7/2002 | |
| KR | 10-0400526 B1 | 12/2003 | |
| KR | 10-2008-0049974 A | 6/2008 | |
| KR | 2008049974 A * | 6/2008 | C08F 14/06 |
| KR | 10-2010-0005283 A | 1/2010 | |
| KR | 10-2011-0008881 A | 1/2011 | |
| KR | 10-1198530 B1 | 11/2012 | |
| KR | 10-1671487 B1 | 11/2016 | |
| KR | 101715450 B1 * | 3/2017 | |

* cited by examiner

Primary Examiner — Kelechi C Egwim
(74) Attorney, Agent, or Firm — Bryan Cave Leighton Paisner LLP

(57) ABSTRACT

The present disclosure provides a composition for preparing a vinyl chloride-based polymer, including a vinyl chloride-based first seed; a vinyl chloride-based second seed; an initiator composition including a water-soluble initiator and an oil-soluble initiator; a reducing agent; and a vinyl chloride-based monomer, wherein a metal catalyst is not included in the composition, and a method for preparing a vinyl chloride-based polymer using the same.

8 Claims, 4 Drawing Sheets

COMPOSITION FOR PREPARING VINYL CHLORIDE-BASED POLYMER AND METHOD FOR PREPARING VINYL CHLORIDE-BASED POLYMER USING THE SAME

CROSS-REFERENCE TO RELATED APPLICATIONS

The present application is a National Stage Application of International Application No. PCT/KR2019/013091 filed on Oct. 7, 2019 and claims the benefit of priority based on Korean Patent Application No. 10-2018-0119879, filed on Oct. 8, 2018, the entire contents of which are incorporated herein by reference.

TECHNICAL FIELD

The present disclosure relates to a composition for preparing a vinyl chloride-based polymer and a method for preparing a vinyl chloride-based polymer using the same, more particularly, to a composition which may be used for preparing a vinyl chloride-based polymer having improved foaming properties and a method for preparing a vinyl chloride-based polymer using the same.

BACKGROUND ART

A vinyl chloride-based polymer is a polymer including 50% or more of repeated units derived from a vinyl chloride monomer (VCM), cheap and easy to control the hardness thereof, and applicable in most processing instruments, and thus, has various application fields. In addition, since the vinyl chloride-based polymer may provide a molded article having excellent physical and chemical properties, for example, mechanical strength, weather resistance, chemical resistance, etc., the vinyl chloride-based polymer is widely used in various fields.

Such a vinyl chloride-based polymer is prepared in different types according to use. For example, a vinyl chloride-based polymer for straightening processing such as an extrusion process, a calendar process and an injection process is generally prepared by suspension polymerization, and a vinyl chloride-based polymer for paste processing such as dipping, spraying and coating is prepared by emulsion polymerization.

By the paste processing, generally, a vinyl chloride-based polymer latex for paste processing, obtained by emulsion polymerization is dried by a spray drying method to form final resin particles, and the particles are dispersed in a solvent or a plasticizer to be applied to products such as flooring materials, wall papers, tarpaulins, raincoats, gloves, car underbody coatings, sealants and carpet tiles, through processes such as coating (reverse roll-coating, knife coating, screen coating, spray coating), gravure and screen printing, rotation casting, and shell casting and dipping.

Such a vinyl chloride-based polymer for paste processing alone has low processability, and its application is difficult, and accordingly, is processed into a plastisol type commonly composed of various additives such as a thermal stabilizer together with a plasticizer, and then used.

In coating a product with a plastisol, the viscosity of the plastisol is required to be kept low for easy processing, and accordingly, a viscosity reducing agent is used. The viscosity reducing agent includes a diluent component which is an aliphatic hydrocarbon and a wetting agent component which is a carboxylic acid ester, and during processing, the diluent component is changed into total volatile organic carbon (TVOC), resulting in problems of being harmful to environment and the human body.

In addition, the viscosity reducing agent has defects of degrading foaming properties such as foam white index, the dense nature of a foam cell, and foam restoring force in a product for foam processing. Accordingly, research on a vinyl chloride-based polymer having improved foaming properties when applied to a product for foam processing, and a method for preparing the same is being continuously conducted.

PRIOR ART DOCUMENT

Patent Document

JP 2970659 B2 (Aug. 27, 1999)

DISCLOSURE OF THE INVENTION

Technical Problem

An object of the present invention is to provide a composition for preparing a vinyl chloride-based polymer, which may be used for preparing a vinyl chloride-based polymer supplementing the limitations of foaming properties such as foam color and the dense nature of a foam cell of the conventional vinyl chloride-based polymer.

In addition, another object of the present invention is to provide a method for preparing a vinyl chloride-based polymer using the composition for preparing a vinyl chloride-based polymer, which may decrease polymerization time and is economic.

Technical Solution

In an aspect, there is provided in the present invention a composition for preparing a vinyl chloride-based polymer, including a vinyl chloride-based first seed; a vinyl chloride-based second seed; an initiator composition including a water-soluble initiator and an oil-soluble initiator; a reducing agent; and a vinyl chloride-based monomer, wherein a metal catalyst is not included in the composition.

In another aspect, there is provided in the present invention a method for preparing a vinyl chloride-based polymer, including a step of polymerizing a vinyl chloride-based monomer in the presence of a vinyl chloride-based first seed, a vinyl chloride-based second seed, an initiator composition including a water-soluble initiator and an oil-soluble initiator, and a reducing agent, wherein a metal catalyst is not used in the method.

In another aspect, there is provided in the present invention a vinyl chloride-based polymer prepared by the preparation method and including small-size particles with an average particle diameter of 0.6 μm or less in 50 wt % or more based on a total weight of a polymer, and a plastisol including the same.

Advantageous Effects

By using the composition for preparing a vinyl chloride-based polymer of the present invention, a vinyl chloride-based polymer having excellent foaming properties such as foam color, the dense nature of a foam cell and foam restoring force, may be prepared.

In addition, according to the preparation method using the composition for preparing a vinyl chloride-based polymer of the present invention, polymerization time is reduced, and the preparation method is economic.

BEST MODE FOR CARRYING OUT THE INVENTION

Figure 1:
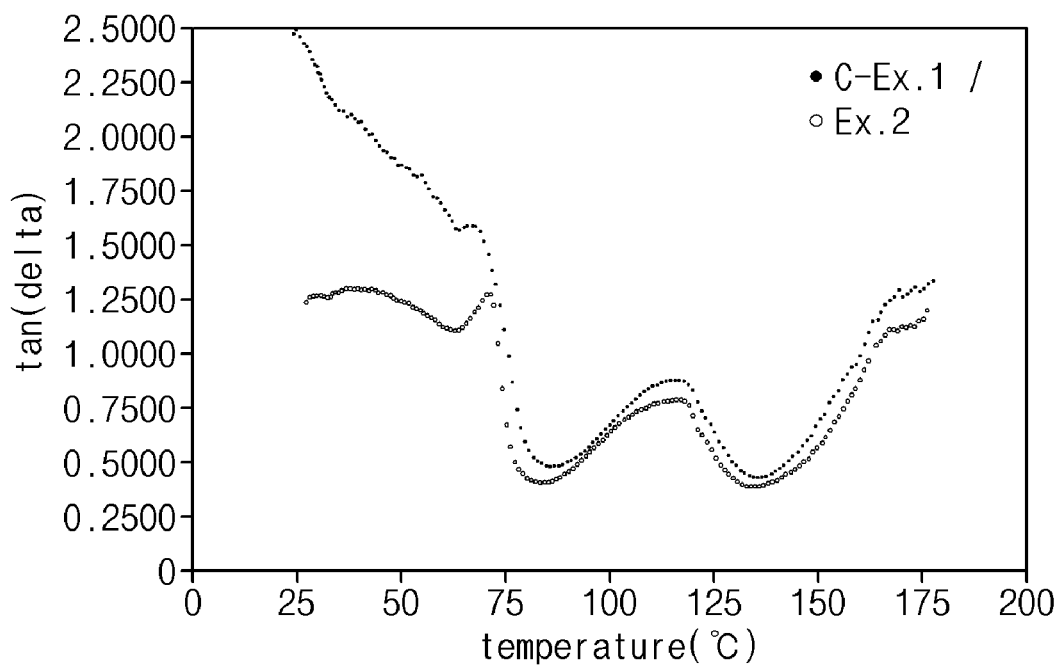
FIG. 1 shows graph results on storage loss coefficient (Tan delta, @170° C., G"/G') of foams according to Example 2 of the present invention and Comparative Example 1.

Hereinafter, the present invention will be described in more detail to assist the understanding of the present invention.

It will be understood that words or terms used in the description and claims shall not be interpreted as the meaning defined in commonly used dictionaries. It will be further understood that the words or terms should be interpreted as having a meaning that is consistent with their meaning of the technical idea of the invention, based on the principle that an inventor may properly define the meaning of the words or terms to best explain the invention.

The term "composition" used in the present disclosure includes a mixture of materials including a corresponding composition as well as a reaction product formed from the materials of the corresponding composition and the decomposition product of the corresponding composition.

The term "composition for preparing a vinyl chloride-based polymer" used in the present disclosure may mean a mixture of reactants injected to a reactor until a corresponding point immediately before initiating polymerization reaction, that is, a point before a polymerization conversion ratio of 0%.

The term "vinyl chloride-based polymer" used in the present disclosure represents all compounds produced by polymerizing a vinyl chloride-based monomer and may mean a polymer chain derived from a vinyl chloride-based monomer.

The term "plastisol" used in the present disclosure represents a mixture of a resin and a plasticizer so as to mold, cast or process into a continuous film phase by heating, for example, may represent a paste phase obtained by mixing a vinyl chloride-based polymer and a plasticizer.

The term "plasticizer" used in the present invention may represent an organic additive material which plays the role of improving molding processability of the resin at a high temperature by adding to a thermoplastic resin to increase thermoplasticity.

In the present disclosure, an average particle diameter ($D_{50}$) may be defined as a particle diameter corresponding to 50% of number accumulated amount in a particle diameter distribution curve of particles. The average particle diameter ($D_{50}$) may be measured using, for example, a laser diffraction method. The laser diffraction method may generally measure the particle diameter from a submicron region to about a few mm degree, and results with high reproduction and high resolution may be obtained.

1. Composition for Polymerizing Vinyl Chloride-Based Polymer and Preparation Method Thereof According to an embodiment of the present invention, there is provided a composition for preparing a vinyl chloride-based polymer, including a vinyl chloride-based first seed; a vinyl chloride-based second seed; an initiator composition including a water-soluble initiator and an oil-soluble initiator; a reducing agent; and a vinyl chloride-based monomer, wherein a metal catalyst is not included in the composition.

Hereinafter, each component composing the composition for preparing a vinyl chloride-based polymer of the present invention will be explained in detail.

Initiator Composition Including Water-Soluble Initiator and Oil-Soluble Initiator According to an embodiment of the present invention, the composition is characterized in including an initiator composition, and the initiator composition includes a water-soluble initiator and an oil-soluble initiator but does not include a metal catalyst.

Generally, in case of seed emulsion polymerization, a water-soluble initiator is used, and a decomposed initiator produces radicals in an aqueous solution phase to initiate the reaction of a monomer in an aqueous phase or diffuses into a micelle including a monomer to induce initiation reaction, thereby performing polymerization reaction. However, by this method, the control of critical micelle concentration is difficult, the diffusion of the initiator into the micelle is not smooth, and there are problems that a reaction rate is slow, polymerization reaction time is increased, and productivity is very low.

Accordingly, in order to improve reactivity, as a polymerization reaction utilizing an oxidation reduction system, a polymerization reaction in which a metal catalyst and a reducing agent are injected, the metal of the metal catalyst receives electrons from the reducing agent and transfers the electrons received to an oil-soluble initiator to initiate the reaction, may be applied. According to this, reactivity is improved, bubble formation is restrained, the removal of heat is advantageous, and the foaming properties of the vinyl chloride polymer thus prepared are also excellent. However, if the oxidation reduction initiation system in which the metal catalyst is injected, is applied, a metal remains in a final polymer, and the quality of a product may be deteriorated, defects relating to color or environmental contamination may be induced.

However, the composition for preparing a vinyl chloride-based polymer according to an embodiment of the present invention is characterized in not including a metal catalyst and performing similar polymerization reaction as the oxidation reduction system. That is, by injecting a water-soluble initiator and an oil-soluble initiator simultaneously, without injecting a metal catalyst, the initiator directly receives electrons from the reducing agent to initiate the reaction.

According to an embodiment of the present invention, the composition for polymerizing is characterized in including a water-soluble initiator and an oil-soluble initiator at the same time. That is, the water-soluble initiator and the oil-soluble initiator may directly arise initiation reaction by the reducing agent, and because the initiation reaction is not performed via a metal catalyst, effects of markedly improving reactivity may be achieved. In addition, since a metal catalyst is not included, no metal remains in a final polymer, and accordingly, defects accompanied therewith may also be solved.

Rather, if an initiator system according to the present invention, i.e., a water-soluble initiator and an oil-soluble initiator and the conventional oxidation reduction initiation system using a metal catalyst and a reducing agent are applied at the same time, the control of the reaction is impossible, and there is a high risk of explosive reaction. If only a metal catalyst is used, a residual metal remains without any effects on reactivity, and the metal catalyst may act as an obstacle in the initiation system according to the present invention and may delay the reaction.

The water-soluble initiator may be one or more selected from the group consisting of potassium persulfate, sodium persulfate, ammonium persulfate and hydrogen peroxide.

The amount of the water-soluble initiator may be 360 ppm or less, or 340 ppm or less, or 320 ppm or less, and 160 ppm or more, or 180 ppm or more, or 220 ppm or more based on the weight of the vinyl chloride-based monomer in the composition for preparing a vinyl chloride-based polymer.

If the water-soluble initiator satisfies the above-described amount range in the present invention, effects of improving white index and the dense nature of a foam cell during foaming the vinyl chloride-based polymer prepared using the composition for preparing a vinyl chloride-based polymer of the present invention, may be achieved.

The oil-soluble initiator may be one or more selected from the group consisting of lauryl peroxide (LPO), di-2-ethylhexyl peroxycarbonate (OPP), diisopropyl peroxy dicarbonate, t-butyl peroxypivalate, t-butylperoxyneodecanoate and 2,2-azobisisobutyronitrile.

The amount of the oil-soluble initiator may be 1000 ppm or less, or 900 ppm or less, or 850 ppm or less, and 500 ppm or more, or 600 ppm or more, or 700 ppm or more based on the weight of the vinyl chloride-based monomer in the composition for preparing a vinyl chloride-based polymer.

If the oil-soluble initiator satisfies the above-described amount range in the present invention, effects of improving the foam white index and the dense nature of a foam cell of the vinyl chloride-based polymer prepared using the composition for preparing a vinyl chloride-based polymer of the present invention, may be achieved.

Reducing Agent

The composition for preparing a vinyl chloride-based polymer according to an embodiment of the present invention includes a reducing agent. The reducing agent may be one or more selected from the group consisting of ascorbic acid, potassium metabisulfite (PMBS), and sodium formaldehyde sulfoxylate (SFS).

The amount of the reducing agent may be 100 ppm or less, or 95 ppm or less, or 90 ppm or less, and 60 ppm or more, or 70 ppm or more, or 80 ppm or more based on the weight of the vinyl chloride-based monomer in the composition for preparing a vinyl chloride-based polymer.

In the present invention, if the reducing agent satisfies the above-described numerical range, the improving effects of the foam white index and the dense nature of the foam cell of the vinyl chloride-based polymer prepared using the composition for preparing a vinyl chloride-based polymer of the present invention, may be achieved.

The reducing agent is included with the water-soluble initiator and the oil-soluble initiator, and may play the role of connecting interactions such that the oil-soluble initiator promotes the initiation reaction of the water-soluble initiator and the water-soluble initiator promotes the initiation reaction of the oil-soluble initiator.

Seed Mixture Including Vinyl Chloride-Based First Seed and Second Seed

The composition for preparing a vinyl chloride-based polymer according to an embodiment of the present invention may be a composition applied to seed emulsion polymerization. Accordingly, the composition includes the first seed and the second seed, which have different average particle diameters, and may impart the particle size distribution of the vinyl chloride-based polymer with bimodal. The vinyl chloride-based polymer having the particle size distribution of bimodal imparts the plastisol with shear thinning properties and improves rheological properties, and through the control of the appropriate ratio of small-size particles and large-size particles, the adjustment between foaming properties and rheological properties may become advantageous.

The weight ratio of the first seed and the second seed in the composition for preparing a vinyl chloride-based polymer may be 1:1 to 1:3.

In the present invention, the amount of the vinyl chloride-based first seed may be 10 parts by weight or less, or 8 parts by weight or less, or 6 parts by weight or less, or 5 parts by weight or less, and 2.5 parts by weight or more, or 3 parts by weight of more, or 3.5 parts by weight or more based on 100 parts by weight of the vinyl chloride-based monomer in the composition for preparing a vinyl chloride-based polymer. If the first seed satisfies the range, the mechanical properties, particle size properties, etc. of the vinyl chloride-based polymer prepared using the composition for polymerizing of the present invention may be improved, and further, excellent effects of foam color, the dense nature of a foam cell, etc., may be achieved.

In addition, the first seed may be prepared through the following method:

a) a step of injecting 100 parts by weight of a vinyl chloride-based monomer to a reactor filled with a first emulsifier and initiating polymerization at a temperature of 30° C. to 70° C.; and b) a step of continuously injecting a second emulsifier during polymerizing and performing emulsion polymerization for 4 hours to 10 hours.

The reactor filled with the first emulsifier of the step a) represents a reactor containing an emulsion including the first emulsifier, and the emulsion may include polymerization water, a polymerization initiator, etc. in addition to the first emulsifier.

The vinyl chloride-based monomer used for preparing the first seed may mean a vinyl chloride monomer alone, or a mixture of a vinyl chloride monomer and a vinyl-based monomer which is capable of copolymerizing therewith. In other words, the vinyl chloride-based polymer may be a homopolymer of vinyl chloride, a copolymer of a vinyl chloride monomer and a vinyl-based monomer which is copolymerizable therewith. If the vinyl chloride-based polymer is the copolymer, vinyl chloride may be included in 50% or more.

The vinyl-based monomer which is copolymerizable with the vinyl chloride-based monomer is not specifically limited. For example, olefin compounds such as ethylene, propylene and butene, vinyl esters such as vinyl acetate, vinyl propionate and vinyl stearate, unsaturated nitriles such as acrylonitrile, vinyl alkyl ethers such as vinyl methyl ether, vinyl ethyl ether, vinyl octyl ether and vinyl lauryl ether, halogenated vinylidenes such as vinylidene chloride, unsaturated fatty acids such as acrylic acid, methacrylic acid, itaconic acid, maleic acid, fumaric acid, maleic anhydride and itaconic anhydride and the anhydrides of the fatty acids, unsaturated fatty acid esters such as methyl acrylate, ethyl acrylate, monomethyl maleate, dimethyl maleate and butylbenzyl maleate, crosslinkable monomers such as diallyl phthalate, etc., may be used, and the vinyl-based monomer may be used alone or as a combination of two or more thereof.

The first emulsifier may be one or more selected from the group consisting of sodium lauryl sulfate, lauryl benzene sulfonic acid, alpha-olefin sulfonate, sodium dodecyl benzene sulfonate, sodium lauryl ethoxylated sulfate, sodium octadecyl sulfate, sodium lauryl ether sulfate and linear chain alkylbenzene sulfonate.

In addition, the first emulsifier may be used in 0.01 parts by weight to 1 part by weight, or 0.05 to 0.5 parts by weight based on 100 parts by weight of the vinyl chloride-based monomer, and according to the amount used of the first emulsifier, the average particle diameter of the finally produced first seed may be controlled. For example, according to the increase of the amount used of the first emulsifier, the average particle diameter of the finally produced first seed may increase.

The average particle diameter (D50) of the first seed may be 0.1 µm to 0.4 µm, preferably, 0.1 µm to 0.3 µm, more preferably, 0.15 µm to 0.25 µm.

The polymerization initiator may preferably be a water-soluble initiator, and particularly, one or more selected from the group consisting of potassium persulfate, sodium persulfate, ammonium persulfate and hydrogen peroxide.

In addition, the polymerization water may be used in 70 parts by weight to 130 parts by weight based on 100 parts by weight of the vinyl chloride-based monomer, and the polymerization water may be deionized water.

The second emulsifier of the step b) may be the same as the above-described first emulsifier or included in the first emulsifier, and the first emulsifier and the second emulsifier used in the present invention may mean different kinds of materials, or may mean only the injection order. Accordingly, the first emulsifier and the second emulsifier may be the same material or different materials.

In addition, the second emulsifier may be continuously injected to the reactor during emulsion polymerization, and may be used in 0.01 parts by weight to 9 parts by weight, or 2 to 6 parts by weight based on 100 parts by the vinyl chloride-based monomer.

The amount of the vinyl chloride-based second seed may be 10 parts by weight or less, or 8 parts by weight or less, or 6 parts by weight or less, or 5 parts by weight or less, and 2.5 parts by weight or more, or 3 parts by weight of more, or 3.5 parts by weight of more based on 100 parts by weight of the vinyl chloride-based monomer in the composition for preparing a vinyl chloride-based polymer. If the second seed satisfies the above-described range, the mechanical properties and particle size properties of the vinyl chloride-based polymer prepared using the composition for polymerizing of the present invention may be improved, and excellent effects of foam color, the dense nature of a foam cell, etc., may be achieved.

The second seed may be prepared by injecting 100 parts by weight of a vinyl chloride-based monomer and 0.1 parts by weight to 15 parts by weight, or 0.5 to 12 parts by weight of a third emulsifier to a reactor filled with a polymerization initiator and homogenizing, followed by emulsion polymerizing at a temperature of 30° C. to 70° C.

The reactor filled with the polymerization initiator may represent a reactor containing a mixture solution including the polymerization initiator, and the mixture solution may further include polymerization water, a separate emulsifier, a reaction suppressor, a dispersant, etc. in addition to the polymerization initiator, but is not limited thereto.

The vinyl chloride-based monomer used for preparing the second seed may be the same material as the vinyl chloride-based monomer used for preparing the first seed, and this may be a vinyl chloride monomer as described above or a combination of a vinyl chloride monomer and a vinyl-based monomer which is capable of copolymerizing therewith. Particular explanation is as described above.

The polymerization initiator may preferably be used in 0.01 parts by weight to 2.5 parts by weight, or 0.5 to 2 parts by weight based on 100 parts by weight of the vinyl chloride-based monomer, and according to the amount used of the polymerization initiator, the average particle diameter of the finally produced second seed may be controlled. For example, if the amount used of the polymerization initiator increases, the average particle diameter of the finally produced second seed may decrease.

The second seed may have an average particle diameter ($D_{50}$) of 0.1 µm to 1.0 µm, preferably, 0.2 µm to 0.8 µm, more preferably, 0.4 µm to 0.8 µm.

The polymerization initiator is not specifically limited, and may use one or more among a water-soluble initiator and an oil-soluble initiator, for example, one or more selected from the group consisting of peroxy carbonates, peroxy esters and azo-based compounds. Particularly, the polymerization initiator may be one or more selected from the group consisting of lauryl peroxide (LPO), di-2-ethylhexyl peroxycarbonate (OPP), diisopropyl peroxy dicarbonate, t-butyl peroxypivalate, t-butylperoxyneodecanoate and 2,2-azobisisobutyronitrile.

The third emulsifier may be one or more selected from the group consisting of sodium lauryl sulfate, lauryl benzene sulfonic acid, alpha-olefin sulfonate, sodium dodecyl benzene sulfonate, sodium lauryl ethoxylated sulfate, sodium octadecyl sulfate, sodium lauryl ether sulfate and linear chain alkylbenzene sulfonate, and the separate emulsifier may be the same as the third emulsifier or included therein.

In addition, the reaction suppressor is not specifically limited, and may use, for example, paraquinone, hydroquinone, butylated hydroxytoluene, monomethyl ether hydroquinone, tert-butyl catechol, diphenylamine, triisopropanolamine, triethanolamine, etc.

In addition, the dispersant is not specifically limited, and may use, for example, higher alcohols such as lauryl alcohol, myristic alcohol and stearyl alcohol, or higher fatty acids such as lauryl acid, myristic acid, palmitic acid and stearic acid.

In addition, the polymerization water may be used in 70 parts by weight to 120 parts by weight based on 100 parts by weight of the vinyl chloride-based monomer, and the polymerization water may be deionized water.

The homogenization is not specifically limited but may be performed by homogenizing at a temperature of 20° C. or less, preferably, a temperature of 5° C. to 15° C., using a homogenizer for 1 hour to 3 hours. In this case, the homogenizer is not specifically limited and common one well-known in the art may be used. For example, a rotor-stator type homogenizer may be used, and the total pressure of the homogenizer during homogenizing process may be 1000 psi to 2000 psi. In addition, a polymerization mixture may be distributed to the front part and rear part of the homogenizer for homogenization as necessary.

The emulsion polymerization for preparing the second seed may be performed at a temperature of 30° C. to 70° C. as described above, and particularly, the emulsion polymerization may be initiated by elevating the temperature from the temperature for performing homogenization by 40° C. to 50° C. and proceeding the emulsion polymerization for 5 hours to 15 hours.

Other Additives

According to an embodiment of the present invention, the composition for preparing a vinyl chloride-based polymer may further include an emulsifier, polymerization water, a reaction suppressor and a dispersant.

The composition for polymerizing may further include an emulsifier and may further include one or more emulsifiers. Hereinafter, if two kinds of emulsifiers are included as an example, the emulsifiers will be referred to as a fourth emulsifier and a fifth emulsifier for convenience.

The fourth emulsifier may be injected prior to injecting the vinyl chloride-based monomer to a reactor, and the fifth emulsifier may be continuously injected after initiating polymerization.

In the polymerization step, the fourth emulsifier and the fifth emulsifier may be different materials or the same material, and if the fourth emulsifier and the fifth emulsifier are the same material, the expression of the fourth and fifth may be used to differentiate the injection order of the emulsifiers.

Particularly, each of the fourth emulsifier and the fifth emulsifier may be one or more selected from the group consisting of sodium lauryl sulfate, lauryl benzene sulfonic acid, alpha-olefin sulfonate, sodium dodecyl benzene sulfonate, sodium lauryl ethoxylated sulfate, sodium octadecyl sulfate, sodium lauryl ether sulfate and linear chain alkylbenzene sulfonate.

The fourth emulsifier may be used in 0.01 parts by weight to 0.5 parts by weight based on 100 parts by weight of the vinyl chloride-based monomer.

The fifth emulsifier may be used in 1 part by weight to 10 parts by weight, or 1 part by weight to 3 parts by weight based on 100 parts by weight of the vinyl chloride-based monomer.

In addition, the polymerization water may be used in 70 parts by weight to 130 parts by weight based on 100 parts by weight of the vinyl chloride-based monomer, and the polymerization water may be deionized water.

In addition, the reaction suppressor and the dispersant in the polymerization step may be the same materials as the reaction suppressor and the dispersant used for preparing the second seed.

Vinyl Chloride-Based Monomer and the Like

In the polymerization step of the present invention, the vinyl chloride-based monomer may be the same material as the vinyl chloride-based monomer used for preparing the first seen and/or the second seed, and may be a vinyl chloride monomer, or a combination of the vinyl chloride monomer and a vinyl-based monomer which is copolymerizable therewith as described above. Particular explanation is the same as described above, and its description will be omitted.

As described above, if the composition for preparing a vinyl chloride-based polymer according to the present invention is applied, the vinyl chloride-based polymer thus prepared has excellent mechanical properties and particle size properties, and the degeneration of a polymer due to a metal component during storage may be prevented because a metal catalyst is not used, and economic efficiency may be improved as a polymer having excellent physical properties may be prepared in relatively short time, and significant effects of improving color during foaming, the dense nature of a foaming cell, etc., may be achieved.

The preparation method of a vinyl chloride-based polymer according to an embodiment of the present invention is characterized in including a step of polymerizing a vinyl chloride-based monomer in the presence of a vinyl chloride-based first seed, a vinyl chloride-based second seed, an initiator composition including a water-soluble initiator and an oil-soluble initiator, and a reducing agent, but not using a metal catalyst.

Hereinafter, each step of the preparation method of the vinyl chloride-based polymer will be explained in particular.

Polymerization Step

In the preparation method of the vinyl chloride-based polymer of the present invention, the polymerization is emulsion polymerization using an aqueous phase as a medium and may be a method appropriate for pure emulsion polymerization, seed emulsion polymerization, or microsuspension seed polymerization. Effects by the initiation system according to the present invention may be applied to a polymerization method which may be classified as the emulsion polymerization, and particularly, may preferably be applied through the seed emulsion polymerization by which bimodal particle size distribution may be achieved.

In the present invention, according to the application of the initiation system according to the present invention, the polymerization may favorably be performed for 190 to 335 minutes, or 220 to 290 minutes, and productivity may be maximized. However, if the polymerization time is less than 190 minutes, polymerization is insufficiently performed and normal productization may become impossible. If the polymerization time is greater than 335 minutes, a conversion ratio is not increased any further but there is concern that only the contamination degree of equipments is increased, and it is unfavorable considering cost-economic sides.

In case of using the composition for preparing a vinyl chloride-based polymer according to the present invention, though a metal catalyst is not used, the polymerization may be completed within a short time as described above, and equivalent or better degree of mechanical properties or particle size properties may be secured when compared with the conventional technique. In addition, improving effects may be expected in the shape, dense nature, color, etc. of a cell during foaming.

Post-Treatment Step

The preparation method of the vinyl chloride-based polymer of the present invention may further include at least one or more steps among washing, agglomeration and drying after the polymerizing step. The drying is not specifically limited and may be performed by a commonly well-known method in the art.

2. Vinyl Chloride-Based Polymer

Another embodiment of the present invention provides a vinyl chloride-based polymer prepared by the above-described preparation method and including 50 wt % or more of small-size particles having an average particle diameter of 0.6 μm or less with respect to the total weight of the polymer.

Particularly, the small-size particles may have an average particle diameter of 0.55 μm or less, or 0.5 μm or less, or 0.45 μm or less, and 0.05 μm or more, or 0.1 μm or more, or 0.15 μm or more.

In addition, the vinyl chloride-based polymer of the present invention may include the small-size particles in 85 wt % or less, or 80 wt % or less, or 75 wt % or less, and 51 wt % or more, or 52 wt % or more, or 55 wt % or more, or 60 wt % or more based on the total weight of the polymer.

If the amount of the small-size particles is less than 50 wt % based on the total weight of the polymer, elasticity among polymer melting properties in foaming section and foaming temperature is decreased (i.e., a storage loss coefficient value is increased), foaming gas could not be collected, a foam cell becomes an open cell and joins with adjacent cells, and a growing phenomenon may be generated. Accordingly, the dense nature of the foam cell may decrease, and foam white index may also decrease due to the decrease of heat resistance.

Also, the vinyl chloride-based polymer may have bimodal particle size distribution as described above, and the amount of large-size particles may be the total excluding the amount of the small-size particles, and the size of the large-size particles may be 0.5 μm or more, preferably, 1.0 μm or more. If the amount of the small-size particles is 50 wt % or more and at the same time the size of the large-size particles is particularly 1.0 μm or more as described above, the dense nature of a foam cell may be excellent, and white index may also be accomplished to a significant degree.

In addition, the vinyl chloride-based polymer may have the residual metal content of 5 ppm or less. Substantially, if the composition for polymerizing according to an embodiment of the present invention is applied, the residual metal content may be substantially 0, and considering the metal residual content due to other factors, 10 ppm or less, preferably, 5 ppm or less, more optimally, 2 ppm or less, substantially 0 ppm.

3. Plastisol

The plastisol according to an embodiment of the present invention includes the vinyl chloride-based polymer including the small-size particles in a specific amount, and may show excellent foaming properties including a storage loss coefficient and foam color.

Particularly, the plastisol of the present invention includes the vinyl chloride-based polymer, and may have white index of 50 to 70 and a storage loss coefficient (Tan delta, @170° C., G"/G') of 1.20 or less. Here, the storage loss coefficient (Tan delta) means loss modulus/storage modulus.

In addition, the vinyl chloride-based polymer of the present invention may have white index of 68 or less, or 66 or less, or 64 or less, and 52 or more, or 54 or more, or 56 or more.

If the white index is less than 50, heat resistance is inadequate, foam color becomes dark, and the availability of a foam is degraded. If the white index is greater than 70, high cost may be consumed during manufacturing in contrast to the availability of such foam, undesirably.

In addition, the vinyl chloride-based polymer of the present invention may have a storage loss coefficient (Tan delta, @170° C., G"/G') of 1.21 or less, or 1.18 or less, or 1.15 or less, or 1.12 or less, and 0.5 or more, or 0.7 or more, or 0.9 or more.

If the storage loss coefficient is greater than 1.20, elasticity among polymer melting properties in foam section and temperature is decreased, foaming gas could not be collected, a foam cell becomes an open cell and joins with adjacent cells, and a growing phenomenon may be generated. Accordingly, the dense nature of the foam cell may decrease, and foam white index may also decrease due to the decrease of heat resistance.

For example, the plastisol may further include a plasticizer in 40 parts by weight to 180 parts by weight, preferably, 80 parts by weight to 160 parts by weight, more preferably, 100 parts by weight to 140 parts by weight based on 100 parts by weight of the vinyl chloride-based polymer, and may further include an additive such as a dispersant diluent, a thermal stabilizer, a viscosity regulator and a foaming agent, as necessary.

The plasticizer and the additive may use common ones well-known in the art.

EXAMPLES

Preparation Example 1—Vinyl Chloride-Based First Seed

To a 500 L, high-pressure reactor, 230 kg of polymerization water, 184 g of sodium lauryl sulfate (SLS) as a first emulsifier, and 110 g of potassium persulfate (KPS) as a water-soluble initiator were injected, and vacuum is applied to the reactor while stirring. To the reactor in a vacuum state, 185 kg of a vinyl chloride monomer was injected, and the temperature of the reactor was increased to 56° C. and polymerization was performed. If polymerization reaction is initiated, 11.1 kg of sodium lauryl sulfate (SLS) was continuously injected for 5 hours to the reactor as a second emulsifier. If the pressure of the reactor reached 4 kg/cm$^2$, the reaction was finished, unreacted vinyl chloride monomer was recovered and removed to prepare a vinyl chloride-based first seed with 0.2 μm.

Preparation Example 2—Vinyl Chloride-Based Second Seed

To a 200 L, high pressure reactor, 73 kg of deionized water, 1.21 kg of lauryl peroxide (LPO), and 0.9 g of paraquinone were injected, and a vacuum of −730 mmHg was applied to the reactor. To the reactor in a vacuum state, 66 kg of a vinyl chloride monomer and 7.8 kg of sodium dodecyl benzene sulfonate as an emulsifier were injected, followed by stirring for 15 minutes. The inner temperature of the reactor was decreased to 20° C. or less, and homogenization was performed for 2 hours using a rotor-stator type homogenizer. After completing homogenization, the inner temperature of the reactor was adjusted to 42° C. and polymerization was performed. As a result, the pressure of the reactor reached 3.5 kg/cm$^2$ after 558 minutes, and the reaction was finished. Unreacted vinyl chloride monomer was recovered and removed to obtain a second seed latex with an average particle diameter of 0.6 μm.

Example 1

To a 500 L, high-pressure reactor, 191 kg of polymerization water, 544 g (4.5% concentration) of potassium persulfate (KPS) as a water-soluble initiator, 125 g of lauryl peroxide (LPO) as an oil-soluble initiator, 2000 g (0.66% concentration) of ascorbic acid as a reducing agent, 17.69 kg (39% concentration) of a first seed, and 18.22 kg (38% concentration) of a second seed were injected, and vacuum was applied to the reactor. To the reactor in a vacuum state, 153 kg of a vinyl chloride monomer was injected, the temperature of the reactor was increased to 58° C., and polymerization was performed. If polymerization reaction was initiated, 10.7 (28% concentration) of sodium lauryl sulfate (SLS) was continuously injected to the reactor for 3 hours as an emulsifier. After 276 minutes, if the pressure of the reactor reached 3.5 kg/cm$^2$, the reaction was finished, unreacted vinyl chloride monomer was recovered to prepare a vinyl chloride-based polymer.

Examples 2 to 8 and Comparative Examples 1 to 6

Vinyl chloride-based polymers were obtained by the same method as in Example 1 except for changing each component content and polymerization time in Example 1 as shown in Table 1 below.

TABLE 1

| | First seed (phm) | Second seed (phm) | Water-soluble initiator (ppm) | Oil-soluble initiator (ppm) | Reducing agent (ppm) | Metal catalyst[1] (ppm) |
|---|---|---|---|---|---|---|
| Example 1 | 5.0 | 4.5 | 160 | 810 | 88 | 0 |
| Example 2 | 5.0 | 4.5 | 260 | 810 | 88 | 0 |
| Example 3 | 5.0 | 4.5 | 300 | 810 | 88 | 0 |
| Example 4 | 5.0 | 4.5 | 360 | 810 | 88 | 0 |
| Example 5 | 3.0 | 4.5 | 260 | 810 | 88 | 0 |
| Example 6 | 5.0 | 3.5 | 260 | 630 | 88 | 0 |
| Example 7 | 5.0 | 5.5 | 260 | 990 | 88 | 0 |
| Example 8 | 5.0 | 4.5 | 260 | 810 | 60 | 0 |
| Comparative Example 1 | 5.0 | 4.5 | 0 | 810 | 50 | 17 |
| Comparative Example 2 | 5.0 | 4.5 | 0 | 810 | 88 | 0 |
| Comparative Example 3 | 5.0 | 4.5 | 260 | 810 | 0 | 0 |
| Comparative Example 4 | 5.0 | 4.5 | 260 | 810 | 0 | 17 |
| Comparative Example 5 | 5.0 | 4.5 | 260 | 810 | 88 | 17 |
| Comparative Example 6 | 5.0 | 4.5 | 160 | 0 | 88 | 0 |

[1]metal catalyst: $CuSO_4$

Experimental Example 1

Polymerization time was measured as time for preparing each of the vinyl chloride-based polymers of the Examples and Comparative Examples, and the amount of small-size particles with an average particle diameter of 0 to 0.6 μm was measured and shown in Table 2 below.

1) Polymerization time: The temperature of a reactor in a vacuum state was increased, and polymerization time was measured by setting a point where the temperature reached a setting temperature (58° C.) to an initial time and a point where the pressure of a reactor reached 3.5 kg/cm² to a finish time.

2) Small-size particle content: The vinyl chloride-based polymer was diluted in deionized water by 1 wt % to prepare a specimen, particle size distribution was measured using a particle size measuring apparatus (DCS24000UHR, CPS Instruments, Inc.), and the wt % of the small-size particles with 0 to 0.6 μm was computed.

TABLE 2

| | Polymerization time (min) | Small-size particle content (wt %) |
|---|---|---|
| Example 1 | 276 | 57 |
| Example 2 | 252 | 66 |
| Example 3 | 245 | 69 |
| Example 4 | 236 | 72 |
| Example 5 | 260 | 56 |
| Example 6 | 282 | 71 |
| Example 7 | 245 | 60 |
| Example 8 | 270 | 67 |
| Comparative Example 1 | 389 | 29 |
| Comparative Example 2 | 596 | 30 |
| Comparative Example 3 | 525 | 42 |
| Comparative Example 4 | 502 | 46 |
| Comparative Example 5 | Explosive reaction | — |
| Comparative Example 6 | Unable to measure due to polymerization delay | — |

In Table 2, it could be confirmed that the polymerization time during preparing the vinyl chloride-based polymer according to the Examples of the present invention was markedly improved when compared with the Comparative Examples. In addition, it could be confirmed that the vinyl chloride-based polymer according to the present invention had a large amount of the small-size particles with 0.6 μm or less when compared with the Comparative Examples.

Experimental Example 2

In order to compare and analyze the foaming properties of each vinyl chloride-based polymer prepared according to the Examples and Comparative Examples, a plastisol including each vinyl chloride polymer was prepared, and the storage loss coefficient of a foam, foam color (white index) and the cross-section of a foam were analyzed. The results are shown in Table 3 and FIG. 1 to FIG. 3.

In order to prepare a plastisol, 100 g of each vinyl chloride-based polymer, 60 g of diisononyl phthalate (DINP), g of $TiO_2$ (KA100, Cosmo Chemical Co.), 50 g of $CaCO_3$ (S500H, REXM), 4 g of azodicarbonamide (ADCA) (AC7000, Kumyang Chemical Co.) as a foaming agent, 3 g of K, Zn metal composite stabilizer (KK42, BAERLOCHER), 1 g of a viscosity regulator (BYK1148, BYK CHEMI), and 5 g of a hydrocarbon solvent (Dsol200, Isu Chemical Co.) were stirred using a Werke mixer (EUROSTAR IKA) in 800 rpm for 10 minutes to prepare each plastisol, and the foaming properties of the plastisol were evaluated as follows.

1) Storage loss coefficient (Tan delta, @170° C., G"/G'): In order to measure the storage loss coefficient, AR2000EX (TA instrument) which is a rotating type rheometer was used. A certain amount of the plastisol specimen thus prepared was applied on a bottom plate, a top plate with a thickness of 25 mm was set with a gap of 1000 μm, sinusoidal vibration input was applied with 1 Hz frequency and shearing deformation of 5% deformation amplitude while elevating the temperature to 25-180° C. (10° C./min), output response characteristics shown on the plates were measured, and loss modulus and storage modulus among the melting properties of a polymer were measured. The loss modulus was divided by the storage modulus to obtain the storage loss coefficient.

2) White index: Each plastisol was applied on a release paper, coated using a bar with 0.5 mm, and dried using a Mathis oven at 150° C. for 45 seconds to manufacture a pregelling sheet, and then was heated at 200° C. for 105 seconds. According to ASTM E313-73, color was measured using Spectrophotometer (KONICA MINOLTA, CM-700D).

3) Cross-section properties of foam: By the same measurement conditions as the white index, a pregelling sheet was manufactured and heated at 200° C. for 100 seconds. A foam cell was cut, and the cross-section of a foam was measured using an optical microscope (NIKON SMZ1500).

TABLE 3

|  | Storage loss coefficient (@170° C., G"/G') | White index |
|---|---|---|
| Example 1 | 1.13 | 54 |
| Example 2 | 1.12 | 58 |
| Example 3 | 1.09 | 56 |
| Example 4 | 1.05 | 55 |
| Example 5 | 1.14 | 57 |
| Example 6 | 1.04 | 59 |
| Example 7 | 1.15 | 55 |
| Example 8 | 1.11 | 57 |
| Comparative Example 1 | 1.29 | 45 |
| Comparative Example 2 | 1.32 | 43 |
| Comparative Example 3 | 1.28 | 42 |
| Comparative Example 4 | 1.27 | 46 |
| Comparative Example 5 | — | — |
| Comparative Example 6 | — | — |

In case of the plastisols using the vinyl chloride-based polymers of the Examples, the storage loss coefficients were smaller than those of the Comparative Examples, and it could be found that the dense nature of foam cells of the Examples was high.

Particularly, FIG. 1 shows graph results of storage loss coefficient (Tan delta, @170° C., G"/G') according to Example 2 of the present invention and Comparative Example 1. In the graph, it could be found that the storage loss coefficient value of Example 2 showed gradually decreasing with the increase of the temperature when compared with Comparative Example 1 in a temperature range of 150° C. or more. Such a low storage loss coefficient value means that elasticity is large, bubbles generated due to a foaming agent during heating are collected well, and a foam cell shows a dense structure.

In addition, in Table 3, it could be confirmed that the plastisol according to an embodiment of the present invention generally shows high foam white index, and heat resistance is excellent.

Figure 2:
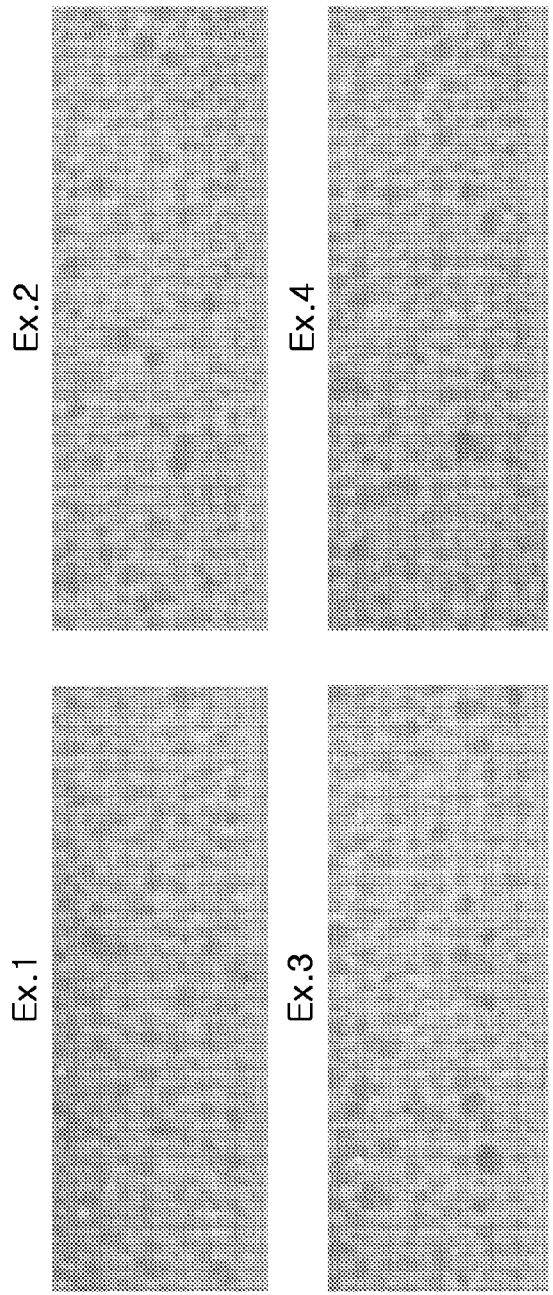
FIG. 2 shows SEM analysis results of foams according to Examples 1 to 4 of the present invention.
Figure 3:
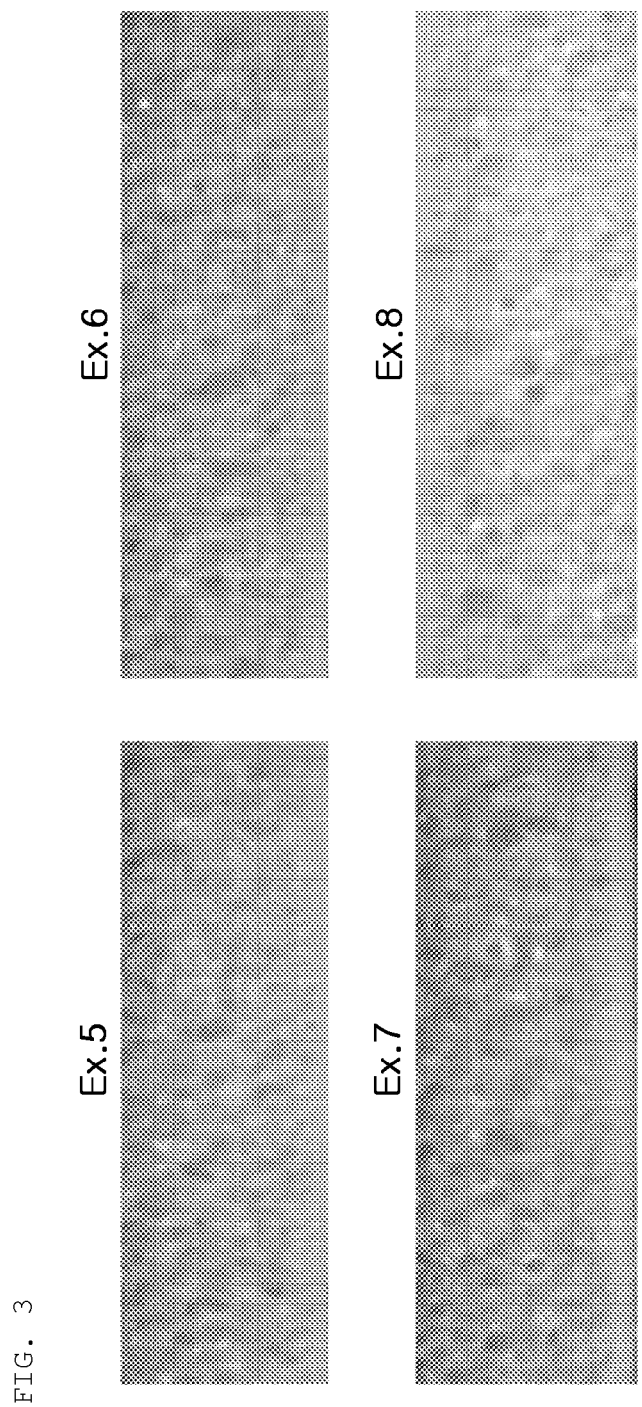
FIG. 3 shows SEM analysis results of foams according to Examples 5 to 8 of the present invention.
Figure 4:
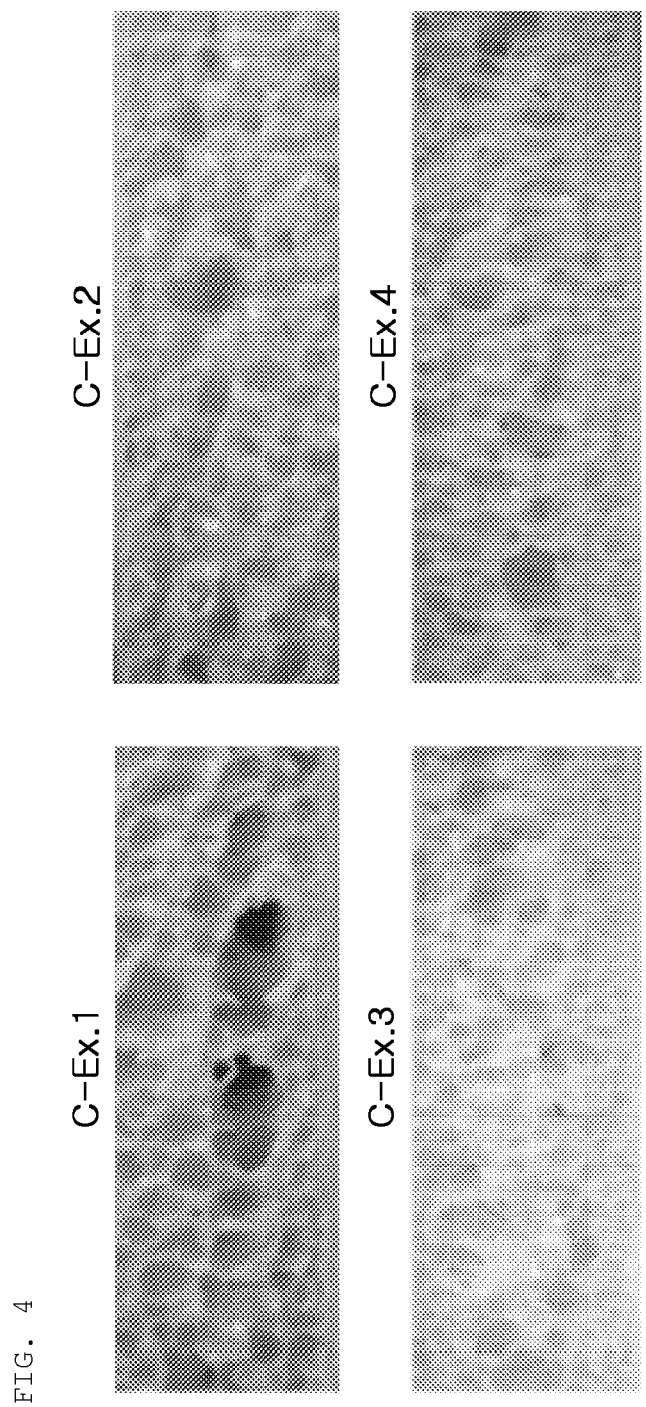
FIG. 4 shows SEM analysis results of foams according to Comparative Examples 1 to 4.

In addition, FIG. 2 shows SEM analysis results of foams according to Examples 1 to 4 of the present invention, FIG. 3 shows SEM analysis results of foams according to Examples 5 to 8 of the present invention, and FIG. 4 shows SEM analysis results of foams according to Comparative Examples 1 to 4. From the results, it could be also confirmed that the Examples of the present invention show uniformly distributed small pores, dense structures and excellent white index (heat resistance) when compared with those of the Comparative Examples.

The invention claimed is:

1. A composition for preparing a vinyl chloride-based polymer, the composition comprising:
   a vinyl chloride-based first seed;
   a vinyl chloride-based second seed;
   an initiator composition comprising a water-soluble initiator and an oil-soluble initiator;
   a reducing agent; and
   a vinyl chloride-based monomer,
   wherein the composition does not comprise a metal catalyst, and
   wherein an amount of the reducing agent is 60 to 100 ppm based on a weight of the vinyl chloride-based monomer.

2. The composition of claim 1, wherein the first seed is comprised in 2.5 to 10 parts by weight based on 100 parts by weight of the vinyl chloride-based monomer.

3. The composition of claim 1, wherein the second seed is comprised in 2.5 to 10 parts by weight based on 100 parts by weight of the vinyl chloride-based monomer.

4. The composition of claim 1, wherein the water-soluble initiator is one or more selected from the group consisting of potassium persulfate, sodium persulfate, ammonium persulfate and hydrogen peroxide.

5. The composition of claim 1, wherein an amount of the water-soluble initiator is 160 to 360 ppm based on a weight of the vinyl chloride-based monomer.

6. The composition of claim 1, wherein the oil-soluble initiator is one or more selected from the group consisting of lauryl peroxide (LPO), di-2-ethylhexyl peroxycarbonate (OPP), diisopropyl peroxy dicarbonate, t-butyl peroxypivalate, t-butylperoxyneodecanoate and 2,2-azobisisobutyronitrile.

7. The composition of claim 1, wherein an amount of the oil-soluble initiator is 500 to 1000 ppm based on a weight of the vinyl chloride-based monomer.

8. The composition of claim 1, wherein the reducing agent is one or more selected from the group consisting of ascorbic acid, potassium metabisulfite (PMBS) and sodium formaldehyde sulfoxylate (SFS).

* * * * *